United States Patent [19]
Jacobsen

[11] 3,901,304
[45] Aug. 26, 1975

[54] TRUCK TO BE USED WHEN CHANGING PATTERN BOARDS IN AUTOMATIC MOULD PART PRODUCING MACHINES

[75] Inventor: Arne Dupont Toft Jacobsen, Skovlunde, Denmark

[73] Assignee: Dansk Industri Syndikat A/S, Herlev, Denmark

[22] Filed: Sept. 19, 1972

[21] Appl. No.: 290,367

[30] Foreign Application Priority Data
Sept. 27, 1971 Denmark .......................... 4684/71

[52] U.S. Cl. ................ 164/159; 164/235; 164/412; 214/84; 214/515; 193/35 R
[51] Int. Cl. ............................................. B60p 1/52
[58] Field of Search ................... 214/38 C, 84, 515; 164/137, 339, 159, 235, 412; 193/35 R

[56] References Cited
UNITED STATES PATENTS
2,788,105  4/1957  Clayton............................ 193/35 R
2,892,554  6/1959  Decker............................. 214/38 C

*Primary Examiner*—Robert G. Sheridan
*Attorney, Agent, or Firm*—Dwight H. Smiley

[57] ABSTRACT

A truck for transporting pattern boards between a storage position and an automatic mold part producing machine having a pressing chamber with end walls on which the pattern boards can releasably be fitted. The truck comprises at least one pair of laterally displaceable pattern board carriers to be individually placed in lateral alignment with a chamber end wall so that the pattern plate may be transferred from the carrier to the end wall and vice versa by a simple displacement.

7 Claims, 4 Drawing Figures

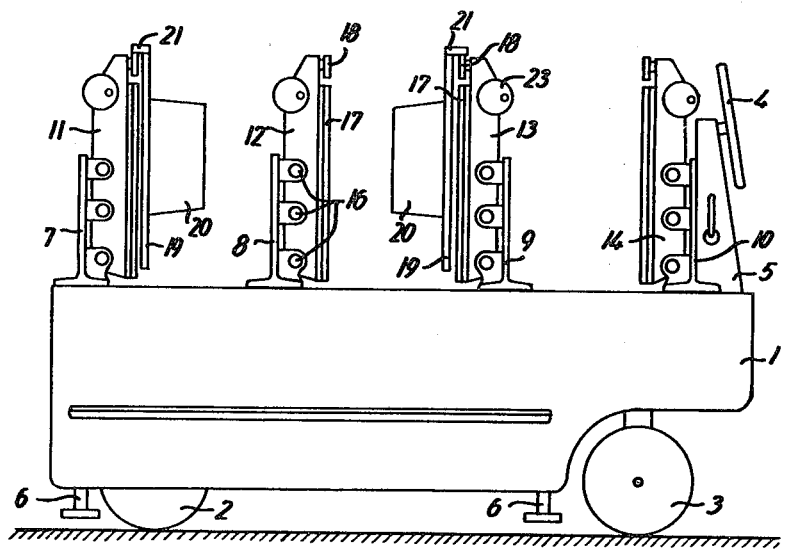
FIG. 1
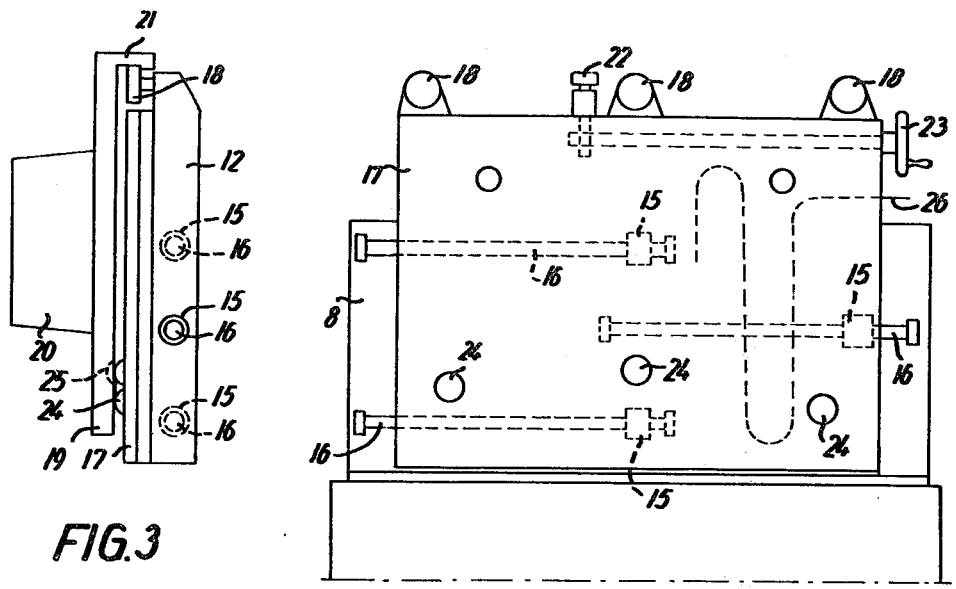
FIG. 3
FIG. 2
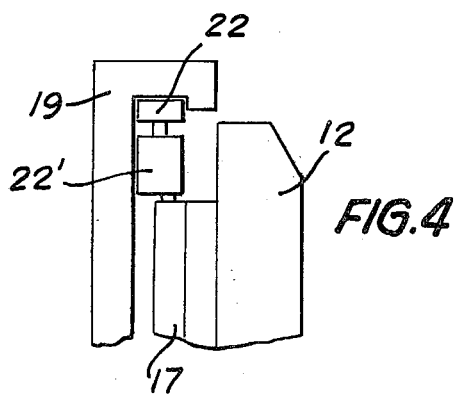
FIG. 4

TRUCK TO BE USED WHEN CHANGING PATTERN BOARDS IN AUTOMATIC MOULD PART PRODUCING MACHINES

BACKGROUND OF THE INVENTION

This invention relates to a truck to be used when changing pattern boards in automatic mold part producing machines of the type that is known, for example, from Jeppesen Patents, namely: Danish Pat. No. 87,462, U.S. Pat. No. 3,008,199, and British Pat. Specification No. 848,604. Machines of this type comprise a pressure chamber that is rectangular in cross-section and is provided with one or more apertures for the introduction of sand or a similar mold part forming particulate material. In the axial direction, the pressure chamber is closed at one end by a vertical pressure plate that is displaceable in the axial direction of the pressure chamber, and at the other end by a counter-pressure plate which, by preference, remains stationary during the mold part pressing operation. To these plates or chamber end walls pattern boards may be releasably secured which, on their facing sides which, carry semi-patterns that are complementary to the end faces of the mold parts to be produced by compressing the material introduced into the pressure chamber. With a view to the mounting and removal of the pattern boards, the chamber end walls can be displaced axially from the chamber into positions in which a change of the pattern boards may take place.

Normally, a large number of pairs of pattern boards are available. When not in use, the pattern boards are stored on suitable shelves or racks in the foundry. While relatively small pattern boards may be handled purely manually, larger and heavier pattern boards require the use of workshop trolleys or trucks for transportation and a small crane or hoisting apparatus for the changing operation proper. This operation is relatively time-consuming so that changing of the pattern boards causes a substantial loss in machine production. Furthermore, there exists the risk of the pattern boards being damaged during the handling operations.

SUMMARY OF THE INVENTION

The invention relates to a special truck which leads to a substantial saving in time when changing the pattern boards and also to a particularly gentle handling of the pattern boards both during the changing operation proper and when they are transported to and from storage.

The truck according to the invention comprises at least one pair of pattern board carriers that are laterally displaceable on the truck and at their top edge have rollers to support a pattern board in aa laterally displaceable manner.

When a pattern board mounted on a chamber end wall is to be replaced, this end wall is shifted into its changing position outside the chamber, and the truck is placed along the side of the mold part producing machine and in such a position that its actual pattern board carrier, both in the lateral and in the vertical direction, is aligned accurately with the chamber end wall in question. Following this, the pattern board carrier is displaced laterally, i.e., in the transverse direction of the truck, towards the end wall, and the pattern plate hitherto used is displaced from the end wall onto the pattern plate carrier, which is then moved back into its transport position on the truck. In an analogous manner, the pattern board of the other end wall is transferred onto the truck which is then run to storage where the pattern boards can be delivered while utilizing the lateral displaceability of the pattern board carriers. The pair of pattern boards that is to be fitted into the mold part producing machine is now transferred from their storage position to the truck in a manner similar to that used when transferring the hitherto used pattern boards from the chamber end walls to the truck. The truck with the new pair of pattern boards is now placed alongside the machine as explained above, and these pattern boards are transferred onto the chamber end walls which are finally shifted back into their operative positions in the pressing chamber. It will be appreciated that the pattern boards can be safely manipulated during the entire handling operation, so that the risk of suffering damage by being jarred and knocked is reduced to a minimum.

According to the invention it is preferred that the truck be fitted with two pairs of pattern board carriers and that one of the carriers of each pair of carriers be placed between the two carriers of the other pair. In this case the truck can be run to the mold part producing machine with a pair of replacement pattern boards supported on one pair of carriers, while the other pair of carriers is free to receive the hitherto used pattern boards. It is possible thereby to achieve a substantial saving in time, particularly since the travel between the machine and storage can be reduced to one double run when changing a pair of pattern boards. The same changing technique may also be employed with only a single pair of carriers provided that each carrier have pattern board accomodations on both sides.

BRIEF DESCRIPTION OF THE DRAWING

FIG. 1 is a rather diagrammatic elevation of a truck according to the invention with two pairs of pattern board carriers, FIG. 2 is a diagrammatic illustration of one of these carriers seen from the front;

FIG. 3 a likewise diagrammatic elevation of the carrier with a pattern board suspended thereupon, and FIG. 4 is a fragmentary side view in elevation of the upper portions of a carrier and a pattern board supported thereby as shown in FIG. 3.

DETAILED DESCRIPTION OF THE INVENTION

In FIG. 1 of the drawing, a truck chassis 1 is equipped with front wheels 2 and rear wheels 3, of which the latter can be steered by means of a steering wheel 4 on a control panel 5. Adjustable feet 6 serve to level and stabilize the truck in relation to the mold part producing machine (not shown). These feet may be operated pneumatically or hydraulically.

Four supports 7, 8, 9 and 10 are mounted on the top of the chassis 1. Supports 7 and 9 form a first pair and supports 8 and 10 a second pair. A pattern board carrier 11, 12, 13 or 14 is associated with each support. Each of these carriers is secured to a plurality of sliding sleeves 15, see FIGS. 2 and 3, that are transversally displaceable on horizontal guide rods 16 on the associated support.

Essentially, each pattern board carrier is constituted by a rectangular plate 17 having at its top edge three carrying rollers 18 on horizontal axes to support a pattern board 19 on a semi-pattern 20 in such a way that the pattern board is displaceable relative to the carrier in the transverse direction of the truck. At the top, the pattern boards 19 have a rearwardly directed carrying flange 21 with a groove that is open in the downward direction, see FIG. 3, to cooperate with the rollers 18. In addition, each carrier comprises at least one roller 22 on a vertical axis, see FIGS. 2 and 4, which likewise engages on the groove in pattern board flange 21. In a manner not shown more detailed, the roller 22 is journalled in a eccentric 22' that is operatively connected to a handwheel 23 for shifting the roller between a first position (shown in FIGS. 3 and 4) in which it spaces pattern board 19 clear of the face of carrying plate 17 by abutment against one lateral face of the groove, and a second position in which the roller 22 bears against the other lateral face of the groove to press the upper part of the pattern board against the carrying plate 17.

At the bottom, the carrying plate 17 is provided with three spherical rollers 24 located at different levels which project slightly in relation to the front of carrying plate 17 and the mutual positioning of which corresponds to the mutual positioning of corresponding recesses or depressions 25 in the rear of pattern board 19. While being displaced in relation to carrying plate 17, pattern board 19 assumes the position shown in FIG. 3 in which it is supported and guided by the rollers 18 and 22 and the spherical rollers 24. When the pattern board 19 is moved into its transporting position in which it substantially covers the carrying plate 17, its recesses 25 are each located opposite to the associated spherical roller 24, and when the roller 22 is withdrawn by means of the handwheel 23, the pattern plate 19 will be in face abutment against the front of carrying plate 17 so as to be stabilized during transportation. In this position, the pattern board 19 may be heated from carrying plate 17 which may contain one or more heating elements, for instance, in the form of electric resistance wires 26, see FIG. 2. It is possible hereby to save time for heating the pattern board after it has been transferred to the mold part producing machine in the manner described in the foregoing.

I claim:

1. A pattern board transporting and changing truck for use with automatic mold part producing machines of the type incorporating a mold part pressure chamber having a pair of axially displaceable end walls to releasably support a pair of pattern boards that are complimentary in shape to the end faces of the mold parts to be produced, comprising a wheeled truck body having at least one pair of pattern board carriers mounted for displacement relative to said truck body between a retracted transport position and an extended pattern board receiving and delivery position relative to said pressure chamber and walls, each carrier having roller means for transferring a pattern board to and from said carrier, when in extended position, by a displacement of the pattern board parallel to the direction of displacement of the carrier relative to the truck body and for supporting said pattern board in a vertical position during transportation, and means to releasably secure said pattern board to said carrier when supported by said roller means.

2. A truck as claimed in claim 1, wherein said roller means comprises a plurality of rollers mounted at an upper portion of said carriers and free to rotate on horizontal axes.

3. A truck as claimed in claim 1, comprising two pairs of pattern board carriers, one carrier of each pair being placed between the two carriers of the other pair.

4. A truck as claimed in claim 1 comprising transversely extending guide rods on said truck body, each carrier being constituted by a plate having a substantially flat front face to form a back rest for the pattern board, said plate on its rear side being provided with sliding sleeves that are displaceable on said transversely extending guide rods.

5. A truck as claimed in claim 4 comprising a suspension flange extending rearwardly from the upper portion of each pattern board and having a downwardly open groove, each carrier at its top edge having at least one additional roller rotatable on a vertical axis to engage with said downwardly open groove in said suspension flange, said roller being shiftable between a first position in which it spaces the pattern board from the carrier front face by abutment against one lateral face of said groove, and a second position in which it forces the pattern board into contact with said carrier front face by abutment against the other lateral face of said groove.

6. A truck as claimed in claim 4, wherein said carrier front face is provided with a plurality of protruding spherical rollers said pattern board having a plurality of roller receiving recesses in its rear surface, said rollers being located at different levels and positionally corresponding to each other.

7. A truck as claimed in claim 1, comprising heating means incorporated in said pattern board carriers.

* * * * *